(12) United States Patent
Patriarca et al.

(10) Patent No.: US 11,803,332 B2
(45) Date of Patent: Oct. 31, 2023

(54) SIDEBAND COMMUNICATION MANAGEMENT

(71) Applicant: Micron Technology, Inc., Boise, ID (US)

(72) Inventors: Massimiliano Patriarca, Milan (IT); Massimiliano Turconi, Gorgonzola (IT); Angelo Alberto Rovelli, Agrate Brianza (IT)

(73) Assignee: Micron Technology, Inc., Boise, ID (US)

( * ) Notice: Subject to any disclaimer, the term of this patent is extended or adjusted under 35 U.S.C. 154(b) by 34 days.

(21) Appl. No.: 17/704,521

(22) Filed: Mar. 25, 2022

(65) Prior Publication Data

US 2022/0308796 A1 Sep. 29, 2022

Related U.S. Application Data

(60) Provisional application No. 63/167,429, filed on Mar. 29, 2021.

(51) Int. Cl.
*G06F 3/06* (2006.01)

(52) U.S. Cl.
CPC .......... *G06F 3/0659* (2013.01); *G06F 3/0619* (2013.01); *G06F 3/0622* (2013.01); *G06F 3/0632* (2013.01); *G06F 3/0652* (2013.01); *G06F 3/0689* (2013.01)

(58) Field of Classification Search
CPC .... G06F 3/0659; G06F 3/0619; G06F 3/0622; G06F 3/0632; G06F 3/0652; G06F 3/0689; G06F 3/0604; G06F 3/061; G06F 3/0653; G06F 3/068
See application file for complete search history.

(56) References Cited

U.S. PATENT DOCUMENTS

| | | | |
|---|---|---|---|
| 4,176,316 A | 11/1979 | DeRosa et al. | |
| 4,780,884 A | 10/1988 | Karabinis | |
| 9,223,735 B2 | 12/2015 | Harriman et al. | |
| 9,928,102 B2* | 3/2018 | Majumdar | G06F 9/30178 |
| 10,243,769 B2 | 3/2019 | Hastings et al. | |
| 2007/0174910 A1* | 7/2007 | Zachman | G06F 21/79 726/18 |
| 2019/0042161 A1* | 2/2019 | Li | G06F 3/0659 |
| 2019/0281052 A1* | 9/2019 | Lekkas | H04L 9/14 |

* cited by examiner

*Primary Examiner* — Jason W Blust
(74) *Attorney, Agent, or Firm* — Brooks, Cameron & Huebsch, PLLC

(57) ABSTRACT

Systems, apparatuses, and methods related to a controller for managing sideband communications are described. A controller includes a front end portion, a central controller portion, a back end portion, and a management unit can manage a first type of memory device that operates according to a first set of timing characteristics and a second type of memory device that operates according to a second set of timing characteristics. The controller can provide an additional layer of encryption or decryption for sideband communications between the host and the memory devices connected to the controller. The front end portion receives sideband communications through an interface and is stored by a cache memory within the central controller portion which also comprises an auxiliary security component to encrypt the sideband communications. The back end portion provides a route to the memory devices and the management unit applies the encryption or decryption to the sideband communication.

15 Claims, 7 Drawing Sheets

US 11,803,332 B2

SIDEBAND COMMUNICATION MANAGEMENT

PRIORITY INFORMATION

This application claims the benefit of Provisional Application Ser. No. 63/167,429, filed on Mar. 29, 2021, the contents of which are incorporated herein by reference.

TECHNICAL FIELD

The present disclosure relates generally to semiconductor memory and methods, and more particularly, to apparatuses, systems, and methods for a controller for sideband communication management.

BACKGROUND

Memory devices are typically provided as internal, semiconductor, integrated circuits in computers or other electronic systems. There are many different types of memory including volatile and non-volatile memory. Volatile memory can require power to maintain its data (e.g., host data, error data, etc.) and includes random access memory (RAM), dynamic random access memory (DRAM), static random access memory (SRAM), synchronous dynamic random access memory (SDRAM), and thyristor random access memory (TRAM), among others. Non-volatile memory can provide persistent data by retaining stored data when not powered and can include NAND flash memory, NOR flash memory, ferroelectric random access memory (FeRAM), and resistance variable memory such as phase change random access memory (PCRAM), resistive random access memory (RRAM), and magnetoresistive random access memory (MRAM), such as spin torque transfer random access memory (STT RAM), among others.

Memory devices may be coupled to a host (e.g., a host computing device) to store data, commands, and/or instructions for use by the host while the computer or electronic system is operating. For example, data, commands, and/or instructions can be transferred between the host and the memory device(s) during operation of a computing or other electronic system. A controller may be used to manage the transfer of data, commands, and/or instructions between the host and the memory devices.

DETAILED DESCRIPTION

Figure 1A:
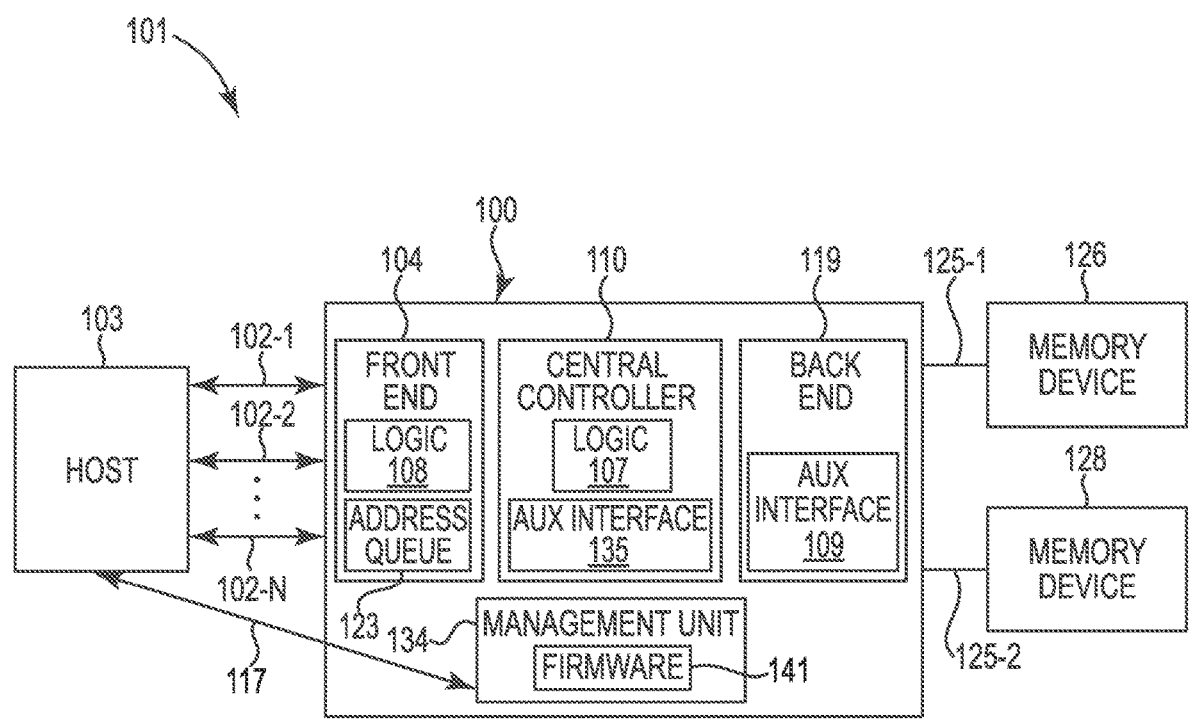
FIGS. 1A-1B illustrate a functional block diagrams in the form of a computing system including a controller for managing sideband communication in accordance with a number of embodiments of the present disclosure.

Systems, apparatuses, and methods related to a controller for managing sideband communication are described. A controller includes a front end portion, a central controller portion, a back end portion, and a management unit that can manage and encrypt communications from a first type of memory device that operates according to a first set of timing characteristics and a second type of memory device that operates according to a second set of timing characteristics.

Systems, apparatuses, and methods related to a controller (e.g., a memory or media controller) for managing sideband communication are described. The controller can orchestrate performance of operations to write data to at least one of multiple types of memory devices. In some embodiments, a first type of memory device can be a DRAM memory device and a second type of memory device can be a FeRAM memory device. The DRAM memory device and the FeRAM memory device can be simultaneously coupled to the memory controller.

The memory controller can include a front end portion, a central controller portion, a back end portion, and a management unit. The front end portion can manage sideband communications. The central controller portion is configured to cause performance of a memory operation and comprises a cache memory to store data associated performance of the memory operation, an auxiliary security component configured to encrypt the data before storing the data in the first type of memory device or the second type of memory device, and an auxiliary interface to post and receive messages. The central controller portion can modify (e.g., encrypt and/or error correct) the data before data is written to at least one of the multiple types of memory devices.

The back end portion can couple to multiple types of memory devices via (e.g., through) a plurality of channels, which can be used to write the data to the multiple types of memory devices. The management unit can couple the memory controller to external circuitry or an external device, such as a host computing device that can generate requests to read or write data to and/or from the memory device(s). The management unit is configured to recognize received commands from the host and manage sideband communications and comprises an input/output (I/O) bus configured to manage data, a management unit controller configured to execute instructions to apply a particular operation code, using the auxiliary security component, as an additional layer of encryption or decryption associated with received host commands for each of the plurality of channels and to execute instructions associated with monitoring the characteristics of the controller, and a memory to store data associated with monitoring the controller.

The memory controller can include a variety of components to manage sideband communication from the host. As used herein, the term "sideband communication" can refer to a method for signaling events and conditions using physical signals separate from the signals forming the Link between two components. In some embodiments described herein, sideband communication can also refer to data, commands, and/or instructions exchanged between the memory controller and the host. In some embodiments, the memory controller can encrypt or decrypt certain communication exchanges with the host.

As memory devices are tasked with performing more complicated operations, multiple types of memory devices with different sets of timing characteristics may be implemented in a memory system to store different types of data. In some embodiments, one of the timing characteristics can be row address strobe timing (tRAS). As used herein, the term "row address strobe timing" generally refers to the minimum number of clock cycles required between a row activation command an issuance of signaling to precharge the row. That is, "row address strobe timing" can relate to an amount of time required by a memory device to refresh a row after an operation involving the row has occurred.

In some approaches, data can be exchanged between the plurality of memory devices and the host without providing protection of the data. As such, data can be exchanged between the host and FeRAM memory device or a DRAM memory device without further encryption or protection. Proprietary data can be viewed and accessed by the host without the ability to protect data by the memory controller.

In contrast, embodiments described herein are directed to a controller configured to manage sideband communications and can encrypt or decrypt certain communication exchanges with the host by multiple types of memory devices, such as memory devices that operate according to differing sets of timing characteristics. By implementing a controller that includes components to allow the controller to manage sideband communications between the host and multiple types of memory devices with differing sets of timing characteristics, the memory controller is able to better protect data. By allowing the controller to mask or unmask data exchanges with the host, the controller is able to determine who views proprietary or secure data by preventing hacks or reverse engineering.

In some embodiments, the memory system can be a Compute Express Link (CXL) compliant memory system (e.g., the memory system can include a PCIe/CXL interface). CXL is a high-speed central processing unit (CPU)-to-device and CPU-to-memory interconnect designed to accelerate next-generation data center performance. CXL technology maintains memory coherency between the CPU memory space and memory on attached devices, which allows resource sharing for higher performance, reduced software stack complexity, and lower overall system cost.

CXL is designed to be an industry open standard interface for high-speed communications, as accelerators are increasingly used to complement CPUs in support of emerging applications such as artificial intelligence and machine learning. CXL technology is built on the peripheral component interconnect express (PCIe) infrastructure, leveraging PCIe physical and electrical interfaces to provide advanced protocol in areas such as input/output (I/O) protocol, memory protocol (e.g., initially allowing a host to share memory with an accelerator), and coherency interface.

In the following detailed description of the present disclosure, reference is made to the accompanying drawings that form a part hereof, and in which is shown by way of illustration how one or more embodiments of the disclosure may be practiced. These embodiments are described in sufficient detail to enable those of ordinary skill in the art to practice the embodiments of this disclosure, and it is to be understood that other embodiments may be utilized and that process, electrical, and structural changes may be made without departing from the scope of the present disclosure.

It is also to be understood that the terminology used herein is for the purpose of describing particular embodiments only, and is not intended to be limiting. As used herein, the singular forms "a," "an," and "the" can include both singular and plural referents, unless the context clearly dictates otherwise. In addition, "a number of," "at least one," and "one or more" (e.g., a number of memory banks) can refer to one or more memory banks, whereas a "plurality of" is intended to refer to more than one of such things.

Furthermore, the words "can" and "may" are used throughout this application in a permissive sense (i.e., having the potential to, being able to), not in a mandatory sense (i.e., must). The term "include," and derivations thereof, means "including, but not limited to." The terms "coupled" and "coupling" mean to be directly or indirectly connected physically or for access to and movement (transmission) of commands and/or data, as appropriate to the context. The terms "data" and "data values" are used interchangeably herein and can have the same meaning, as appropriate to the context.

FIG. 1A illustrates an example functional block diagram in the form of a computing system 101 including a controller 100 for managing sideband communication in accordance with a number of embodiments of the present disclosure. The computing system 101 can manage sideband communications for multiple types of memory (e.g., the memory devices 126, 128). The computing system 101 can include a memory controller 100 comprising a front end portion 104, a central controller portion 110, a back end portion 119, and a management unit 134. The computing system 101 can be coupled to a host 103 and memory devices 126, 128.

In some embodiments, the memory controller 100 can manage a DRAM memory device 126 having a first tRAS and a FeRAM memory device 128 having a second tRAS. In some embodiments, the tRAS of the FeRAM memory device 128 is less than five hundred (500) nanoseconds (ns).

The memory controller 100 can have a front end portion 104 that includes an interface to couple the memory controller 100 to the host 103 through input/output (I/O) lanes 102-1, 102-2, . . . , 102-N (individually or collectively referred to as I/O lanes 102). In some embodiments, there can be eight (8) I/O lanes 102 and in other embodiments there can be sixteen (16) I/O lanes 102. In some embodiments, the plurality of I/O lanes 102 can be configured as a single port. The front end 104 can also include front end logic 108 to manage sideband messages exchanged with the host 103 through the address queue 123.

The memory controller 100 can include a central controller portion 110 that can control, in response to receiving a request from the host 103, performance of a memory operation. The memory operation can be a memory operation to read data from a memory device 126, 128 or an operation to write data to a memory device 126, 128. In some embodiments, the central controller portion 110 can, in response to receiving a request from the host 103, control writing of multiple pages of data substantially simultaneously.

The central controller portion 110 can include a cache memory (e.g., the cache 212 illustrated in FIG. 2, herein) to store data associated with performance of a memory operation, an auxiliary interface 135 to post and receive the data, and/or a security component (e.g., the security component 214 illustrated in FIG. 2, herein) to encrypt data before the data is stored in the DRAM memory device 126, the FeRAM memory device 128, and/or the cache memory. Examples of the security component can include, but are not limited to, software and circuitry configured to implement data encryption, data hashing, data masking, and data tokenization. The data is posted to the host and received from the host through the auxiliary interface 135. The data exchanged with the host 103 can be managed using logic 107 to determine how to direct each communication. In some embodiments, in response to receiving a request from the host 103, data from the host 103 can be stored in cache lines of the cache memory. The data in the cache memory can be written to a memory device 126, 128. In some embodiments, the data can be encrypted using an Advanced Encryption Standard (AES) encryption before the data is stored in the cache memory.

The central controller portion 110 can include error correction code (ECC) encoding circuitry (e.g., the ECC encoding circuitry 216 illustrated in FIG. 2, herein) to ECC encode the data and ECC decoding circuitry (e.g., the ECC decoding circuitry 218 illustrated in FIG. 2, herein) to ECC decode the data. As used herein, the term "ECC encoding" can refer to encoding data by adding redundant bits to the data. As used herein, the term "ECC decoding" can refer to examining the ECC encoded data to check for any errors in the data. The ECC encoding circuitry can encode data that can be written to the DRAM memory device 126 and the FeRAM memory device 128. In some embodiments, an error detected in the data can be corrected immediately upon detection. The ECC decoding circuitry can decode data that has been previously ECC encoded.

In some embodiments, the memory controller 100 can comprise a back end portion 119 comprising a media controller and a physical (PHY) layer that couples the memory controller 100 to a plurality of memory ranks. As used herein, the term "PHY layer" generally refers to the physical layer in the Open Systems Interconnection (OSI) model of a computing system. The PHY layer may be the first (e.g., lowest) layer of the OSI model and can be used transfer data over a physical data transmission medium. In some embodiments, the physical data transmission medium can be a plurality of channels 125-1, 125-2. As used herein, the term "memory ranks" generally refers to a plurality of memory chips (e.g., DRAM memory chips and/or FeRAM memory chips) that can be accessed simultaneously. A memory rank can be sixty four (64) bits wide and each memory rank can have eight (8) pages. In some embodiments, a page size of a first type of memory device (e.g., DRAM memory device) 126 can be larger than a page size of the second type of memory device (e.g., FeRAM memory device) 128.

In some embodiments, the memory controller 100 can include a management unit 134 to recognize commands from the host 103 and to manage sideband communications. The management unit 134 can include an I/O bus to manage out-of-band data, a management unit controller to execute instructions to apply a particular operation code, as an additional layer of encryption or decryption associated with received commands from the host 103. The management unit controller also executes instructions associated with initializing, configuring, and/or monitoring the characteristics of the memory controller 100, and a management unit memory to store data associated with monitoring the characteristics of the memory controller 100. As used herein, the term "out-of-band data" generally refers to data, commands, and/or instructions transferred through a transmission medium that is different from the main transmission medium of a network and can include host commands. For example, out-of-band data can be data transferred to a network using a different transmission medium than the transmission medium used to transfer data within the network.

The additional layer of encryption or decryption added by the management unit controller is done through the auxiliary security component within the management unit 134. The additional layer of encryption or decryption is added on each of the plurality of channels 125-1, 125-2. The additional layer of encryption or decryption include a subset of configuration parameters which are provided and controlled through firmware 141 to mask data towards host 103 for data exchanged between the host 103 and the computing system 101 during initialization, management, and diagnostics of the computing system 101. In a privileged working mode, performance metrics and characterization metrics are masked. The data is protected by the firmware 141.

The additional layer of encryption can be applied using an authentication method to mask sideband communications. The additional layer of encryption can protect sideband communications from reverse engineering. Additional layers of encryption can be added to each signaling with the host in addition to the encryption layer for each of the plurality of channels.

The communication channel 117 can be configured to exchange sideband communications between the host 103 and the memory controller 100 through an I/O bus, which may be separate from a command/address bus or data bus used to communicate between the host 103 and the memory controller 100. In some embodiments, the I/O bus can be a System Management Bus (SMBus). As used herein, the term "SMBus" generally refers to a single-ended simple two-wire bus for the purpose of lightweight communication. An example of an entity inside the host 103 that uses communication channel 117 can be the Baseboard Management Controller (BMC). The BMC is a small controller that can be used for remote server management. Some of the more common use cases are power cycling a server and monitoring fan speeds, component temperatures, and hardware failures.

Firmware 141 masks sideband communications associated with RAID unrecovered error signal events, metrics for device characterization, protected memory commands, imprint removal and asymmetric cycling removal, protected status data, and protected configuration data. Protected configuration data includes timing and power supply configurations, connected memory type identification, cache configurations, and error correction configurations. Error correction configurations can occur during runtime and can be a protected sideband communication.

Erasure of the memory array of the memory controller 100 can be implemented at each power down. A power down can be coordinated or uncoordinated. Erasure of the memory array of the memory controller 100 can be implemented whether the power down is coordinated or uncoordinated. A background full data erase of the DRAM memory device 126 can be performed before power-off of the computing systems 101. The change in the power state of the computing system 101 can be communicated to the memory controller 100 as a sideband communication via the I/O bus. A coordinated power down can also be referred to as a host controlled power-off. A host-controlled power-off can be communicated from the host to the memory controller using protected sideband communications such as additional encryptions. In one embodiment, the request to power-off can trigger a complete erasure of the memory controller's memory array. Once the erasure is complete, a signal can be sent to the host 103. In another embodiment, a host-controlled request to power-off can erase any runtime encryption keys used. A bit can then be sent into the FeRAM memory device 128. At the next power up, the bit can be checked and if true, the entire memory array can be cleared. Once the erasure is complete and the power up is complete, a signal can be sent to the host 103 indicating the end of the clear process; and the bit can be cleared.

An uncoordinated power down can be an example of an emerging sideband communication. To promote transparency, reliability, and persistency, sideband communications can be decrypted, allowing the host to view sideband communications. The decryption can be enacted using vendor specific commands. The commands can support a temporary or a permanent method. During an uncoordinated power down, memory controller 100 can send an interrupt to the management unit controller 134. A bit can then be sent into the FeRAM memory device 128. At the next power up, the bit can be checked and if true, the entire memory array can be cleared. Once the erasure is complete and the power up is complete, a signal can be sent to the host 103 indicating the end of the clear process; and the bit can be cleared.

Figure 1B:
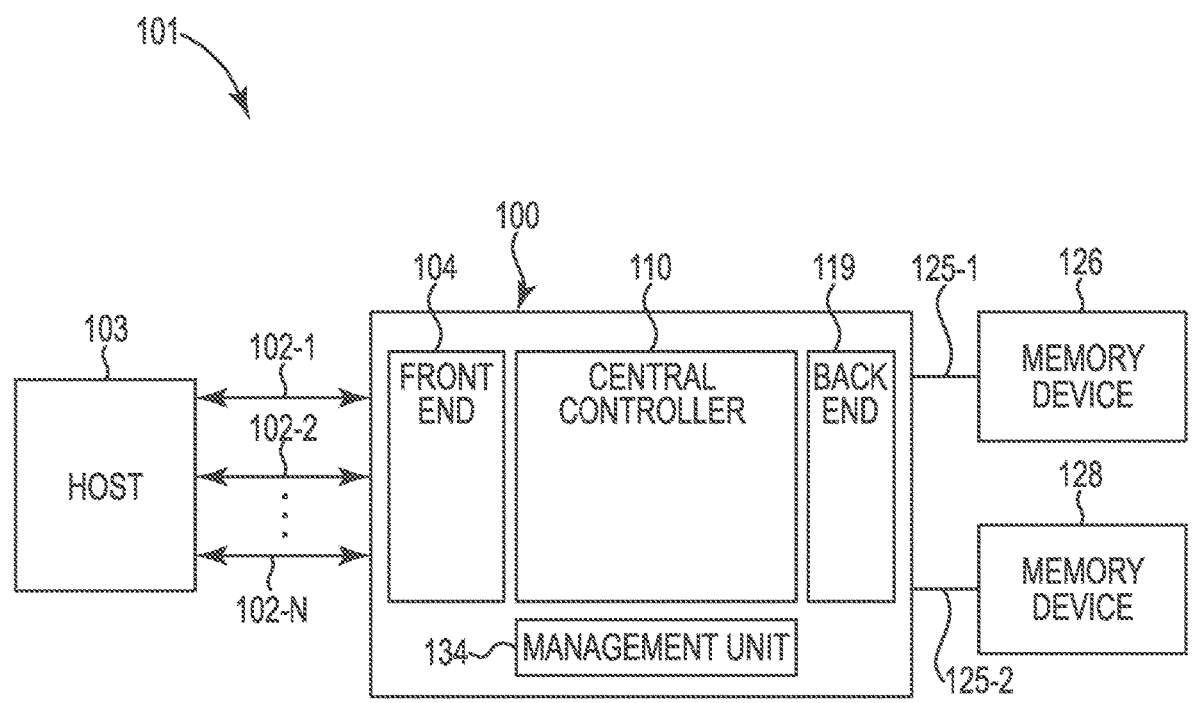

FIG. 1B illustrates another example functional block diagram in the form of a computing system 101 including a controller 100 for managing sideband communications in accordance with a number of embodiments of the present disclosure. The computing system 101 can include a memory controller 100 comprising a front end portion 104, a central controller portion 110, and a back end portion 119. The computing system 101 can be coupled to a host 103 and memory devices 126, 128.

In some embodiments, the memory controller 100 can manage a DRAM memory device 126 having a first tRAS and a FeRAM memory device 128 having a second tRAS. In some embodiments, the tRAS of the FeRAM memory device 128 is less than five hundred (500) nanoseconds (ns). In some embodiments, the memory controller 100 can be configured to manage either the DRAM memory device 126 or the FeRAM memory device 128.

The memory controller 100 can have a front end portion 104 that includes an interface to couple the memory controller 100 to the host 103 through input/output (I/O) lanes 102-1, 102-2, . . . , 102-N (individually or collectively referred to as I/O lanes 102) and circuitry to manage the I/O lanes 102. In some embodiments, there can be eight (8) I/O lanes 102 and in other embodiments there can be sixteen (16) I/O lanes 102. In some embodiments, the plurality of I/O lanes 102 can be configured as a single port.

The memory controller 101 can include a central controller portion 110 that can control, in response to receiving a request from the host 103, performance of a memory operation. The memory operation can be a memory operation to read data from a memory device 126, 128 or an operation to write data to a memory device 126, 128. In some embodiments, the central controller portion 110 can, in response to receiving a request from the host 103, control writing of multiple pages of data substantially simultaneously.

The central controller portion 110 can include a cache memory (e.g., the cache 212 illustrated in FIG. 2, herein) to store data associated with performance of a memory operation and/or a security component (e.g., the security component 214 illustrated in FIG. 2, herein) to encrypt data before the data is stored in the DRAM memory device 126, the FeRAM memory device 128, and/or the cache memory. Examples of the security component can include, but are not limited to, software and circuitry configured to implement data encryption, data hashing, data masking, and data tokenization. In some embodiments, in response to receiving a request from the host 103, data from the host 103 can be stored in cache lines of the cache memory. The data in the cache memory can be written to a memory device 126, 128. In some embodiments, the data can be encrypted using an encryption circuitry before the data is stored in the cache memory. The encryption circuitry used to encrypt the data in the central controller 110 may be an Advanced Encryption Standard (AES) encryption.

In some embodiments, the memory controller 100 can include a management unit 134 to initialize, configure, and/or monitor characteristics of the memory controller 100. The management unit 134 can include an I/O bus to manage out-of-band data, a management unit controller to execute instructions associated with initializing, configuring, and/or monitoring the characteristics of the memory controller, and a management unit memory to store data associated with monitoring the characteristics of the memory controller 100. As used herein, the term "out-of-band data" generally refers to data and/or commands transferred through a transmission medium that is different from the main transmission medium of a network. For example, out-of-band data can be data transferred to a network using a different transmission medium than the transmission medium used to transfer data within the network.

Figure 2:
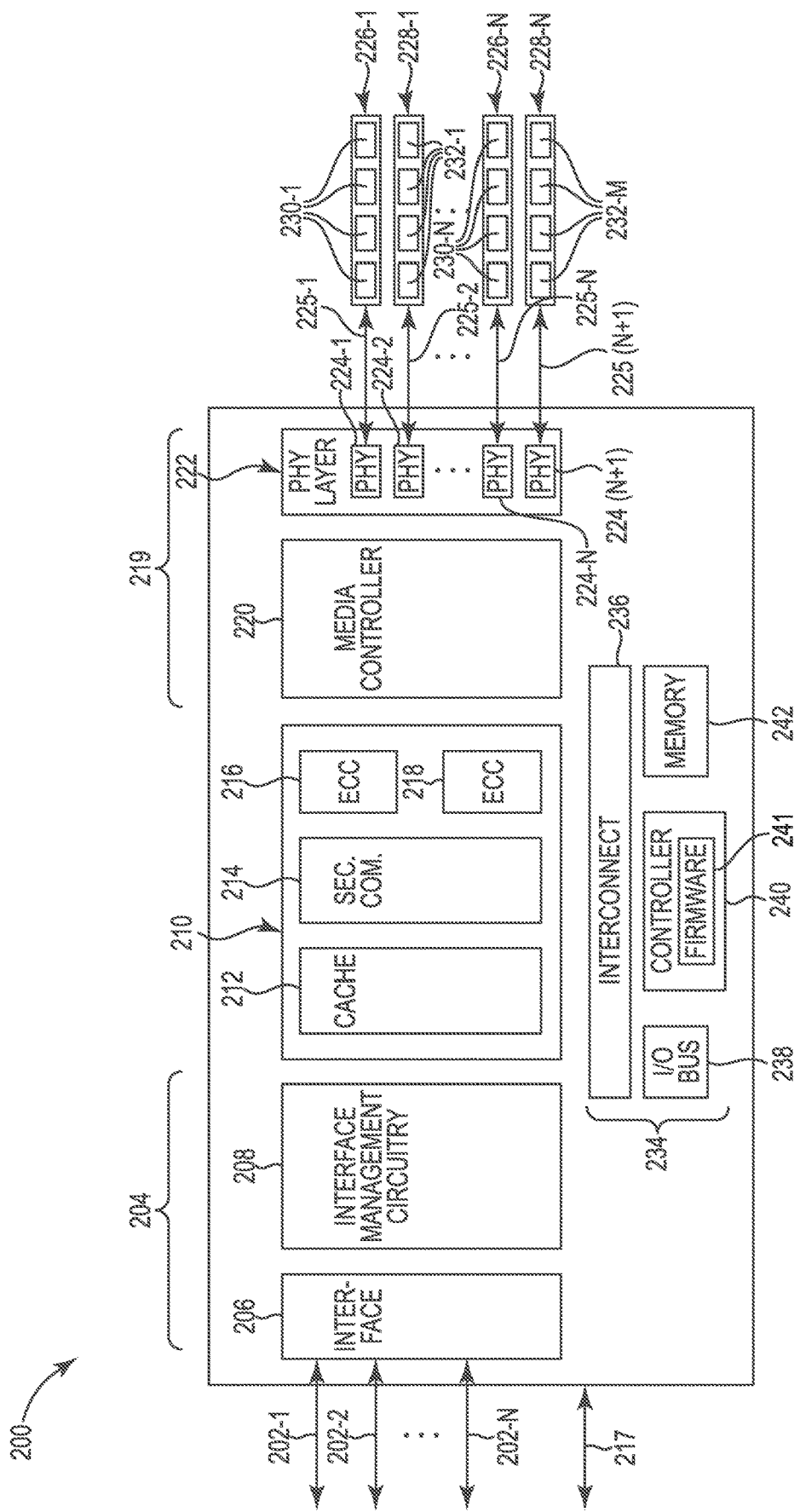
FIG. 2 illustrates a functional block diagram in the form of a controller for managing sideband communication in accordance with a number of embodiments of the present disclosure.

FIG. 2 illustrates a functional block diagram in the form of a memory controller 200 for managing sideband communication in accordance with a number of embodiments of the present disclosure. A memory controller 200 is configured to manage either a first type of memory device (e.g., DRAM memory device) 226-1, . . . , 226-N (individually or collectively referred to as the first type of memory device 226) that operates according to a first set of timing characteristics or a second type of memory device (e.g., FeRAM memory device) 228-1, . . . , 228-N (individually or collectively referred to as the second type of memory device 228) that operates according to a second set of timing characteristics or both types of memory devices simultaneously. In some embodiments, the first set of timing characteristics can be a tRAS of the DRAM memory device 226 and the second set of timing characteristics can be a tRAS of the FeRAM memory device 228. In some embodiments, the first set of timing characteristics can correspond to a timing that is greater than the second set of timing characteristics. In some embodiments, a memory controller 200 can include a front end portion 204, a central controller portion 210, and a back end portion 219.

As shown in FIG. 2, a front end portion 204 can include an interface 206 that includes multiple I/O lanes 202-1, 202-2, . . . , 202-N (individually or collectively referred to as I/O lanes 202), as well as circuitry 208 to manage the interface 206. The interface 206 can be a peripheral component interconnect express (PCIe) 5.0 interface coupled to the I/O lanes 202. In some embodiments, the memory controller 200 can receive access requests involving at least one of the cache memory 212, the first type of memory device 226, and/or the second type of memory device 228 via the PCIe 5.0 interface 206 according to a CXL protocol. The interface 206 can receive data from a host (e.g., the host 103 shown in FIGS. 1A-1B) through I/O lanes 202. The interface management circuitry 208 may use CXL protocols to manage the interface 206.

A central controller portion 210 can be configured to cause performance of a memory operation. The central controller portion 210 can include a cache memory 212 to store data associated with performance of the memory operation.

As shown in FIG. 2, a central controller portion 210 can include an auxiliary security component 214 to encrypt data before storing the data in the DRAM device 226 or FeRAM memory device 228. As stated before, the security component 214 can use an encryption circuitry to encrypt the data. In some embodiments, the security component 214 may encrypt data that is written to the FeRAM memory device 228 but may not encrypt the data that is written to the DRAM memory device 226. The data written to the FeRAM memory device 228 may be encrypted because the FeRAM memory device 228 can have security deficiencies that the DRAM memory device 226 does not have. The security component 214 can be bypassed when it is not used, such as when data is being written to the DRAM memory device 226. In some embodiments, the security component 214 can be enabled or disabled. For example, the security component 214 can be enabled when writing memory to a persistent memory device, such as an FeRAM memory device 228.

As shown in FIG. 2, the central controller portion 210 can include error correction code (ECC) encoding circuitry 216 to ECC encode the data and ECC decoding circuitry 218 to ECC decode the data. In some embodiments, an error detected in the data can be corrected immediately upon detection. The ECC decoding circuitry can decode data that has been previously ECC encoded.

As shown in FIG. 2, the memory controller 200 can include a back end portion 219, including a media controller portion 220 comprising a plurality of media controllers and a physical (PHY) layer portion 222 comprising a plurality of PHY layers 224-1, 224-2, 224-N, . . . , 224-(N+1) (individually or collectively referred to as PHY layer 224). In some embodiments, the back end portion 219 is configured to couple the PHY layer portion 222 to a plurality of memory ranks 230-1, . . . , 230-N (individually or collectively referred to as memory ranks 230) of a first memory device 226 and a plurality of memory ranks 232-1, . . . , 232-M (individually or collectively referred to as memory ranks 232) of a second memory device 228-1, . . . , 228-N (individually or collectively referred to as second memory device 228). The memory ranks 230 can be connected to the memory controller 200 via a plurality of channels 225.

As used herein, the term "substantially" intends that the characteristic needs not be absolute, but is close enough so as to achieve the advantages of the characteristic. For example, "substantially simultaneously" is not limited to operations that are performed absolutely simultaneously and can include timings that are intended to be simultaneous but due to manufacturing limitations may not be precisely simultaneously. For example, due to read/write delays that may be exhibited by various interfaces (e.g., LPDDR5 vs. PCIe), media controllers that are utilized "substantially simultaneously" may not start or finish at exactly the same time. For example, the multiple memory controllers can be utilized such that they are writing data to the memory devices at the same time regardless if one of the media controllers commences or terminates prior to the other.

Each of the plurality of media controllers can receive a same command and address and drive the plurality of channels 225 substantially simultaneously. By using the same command and address for the plurality of media controllers, each of the plurality of media controllers can utilize the plurality of channels 225 to perform the same memory operation on the same plurality memory cells. Each media controller 220 can correspond to a RAID component, as well as ECC encoding circuitry 216 and ECC decoding circuitry 218.

A back end portion 222 can include multiple PHY layers 224 and the media controller portion 220 that is configured to drive the channels 225 that couple PHY layers 224 to the memory ranks 230, 232. In some embodiments, the memory ranks 230, 232 can be DRAM memory ranks 230 and/or FeRAM memory ranks 232. In some embodiments, the memory controller 200 can be coupled to the memory ranks 230, 232 through channels 225 coupled to the back end portion 219 and each of the channels 225 is coupled to four (4) memory ranks 230, 232.

Each media controller 220 can also correspond to one of the plurality of PHY layers 224. In some embodiments, each media controller can execute commands independent of the other media controllers. Therefore, data can be transferred from a PHY layer 224 through a channel 225 to a memory device 226, 228 independent of other PHY layers 224 and channels 225.

The memory controller 200 can include a management unit 234 configured to recognize and manage sideband communications. In some embodiments, the management unit 234 includes an I/O bus 238 to manage out-of-band data, a management unit controller 240 to execute a firmware 241 whose functionalities include, but not limited to, monitoring and configuring the characteristics of the memory controller 200, and a management unit memory 242 to store data associated with memory controller 200 functionalities. An endpoint of the management unit 234 can be exposed to the host system (e.g., the host 103 shown in FIGS. 1A-1B) to manage data through the communication channel 217 using the I/O bus 238. A second endpoint of the management unit 234 can be exposed to the host system to manage data through the communication channel 217 using interface 206. In some embodiments, the characteristics monitored by the management unit 234 can include a voltage supplied to the memory controller 200 or a temperature measured by an external sensor, or both. Further, the management unit 234 can include a local bus interconnect 236 to couple different components of the memory controller 200. In some embodiments, the local bus interconnect 236 can be an advanced high performance bus (AHB). Further, the management unit 234 can include circuitry to manage in-band data. As used herein, the term "in-band data" generally refers to data that is transferred through the main transmission medium within a network, such as a local area network (LAN).

The management unit 234 can include a management unit controller 240. The management unit controller 240 can apply an additional layer of encryption or decryption to sideband messages. In some embodiments, the management unit controller 240 can be a controller that meets the Joint Test Action Group (JTAG) standard and operate according to an Inter-Integrate Circuit ($I^2C$) protocol, and auxiliary I/O circuitry. As used herein, the term "JTAG" generally refers to an industry standard for verifying designs and testing printed circuitry boards after manufacture. As used herein, the term "$I^2C$" generally refers to a serial protocol for a two-wire interface to connect low-speed devices like microcontrollers, I/O interfaces, and other similar peripherals in embedded systems. However, embodiments are not so limited and the circuit protocol can include multiple wire interfaces. In some embodiments, an auxiliary I/O circuitry can couple the management unit 234 to the memory controller 200. Further, firmware for operating the management unit can be stored in the management unit memory 242. In some embodiments, the management unit memory 242 can be a flash memory such as flash NOR memory or other persistent flash memory device.

Figure 3:
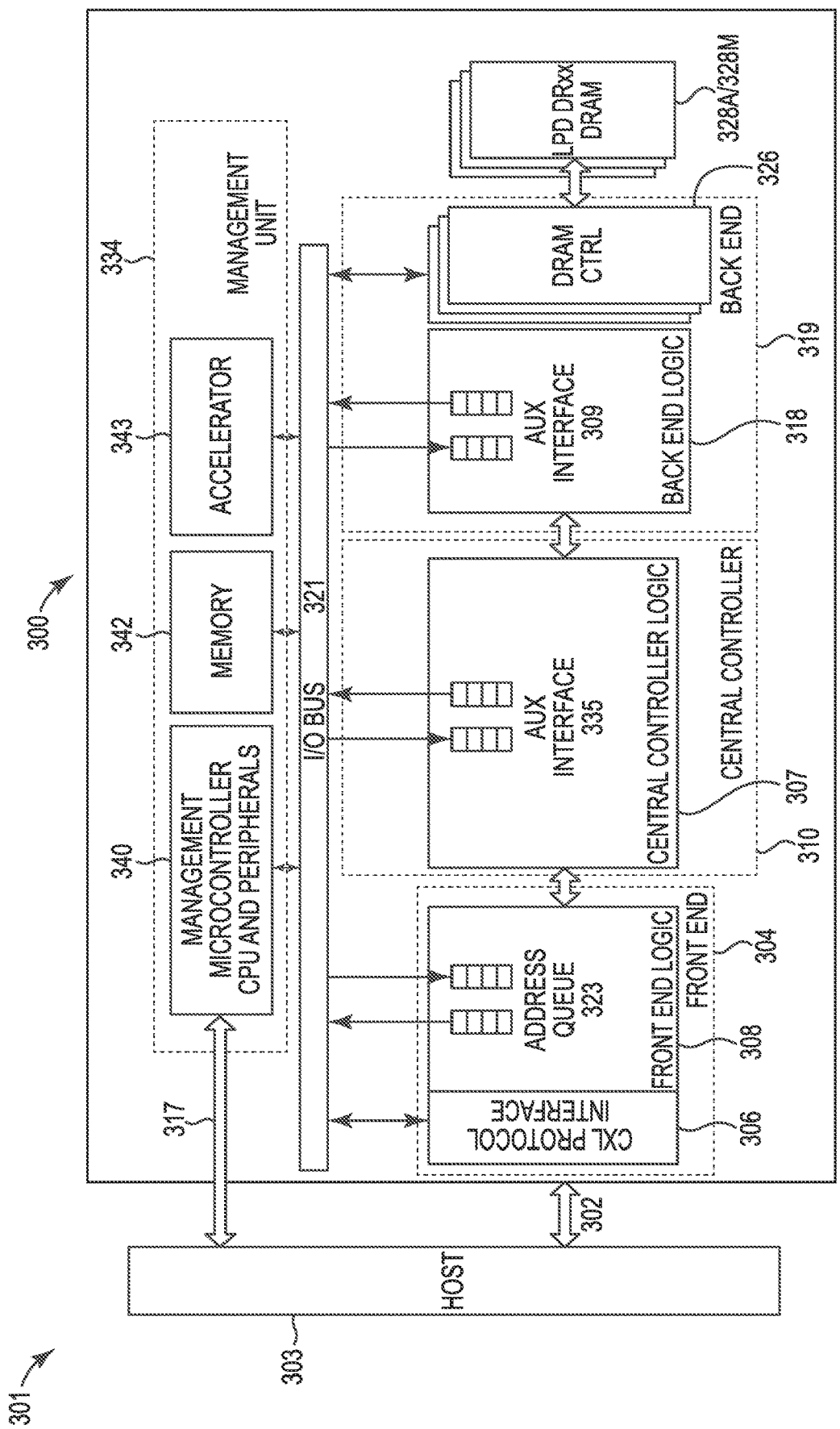
FIG. 3 illustrates a functional block diagram in the form of another computing system including a controller for managing sideband communication in accordance with a number of embodiments of the present disclosure.

FIG. 3 illustrates a functional block diagram in the form of another computing system 301 including a controller 300 for managing sideband communication in accordance with a number of embodiments of the present disclosure. A memory controller 300 is configured to manage a dynamic random access memory (DRAM) memory device 328A having a first row address strobe timing (tRAS) and a ferroelectric random access memory (FeRAM) memory device 328M having a second tRAS. As shown in FIG. 3, the computing system 301 can include a host 303, a communication channel 317 connecting the host 303 to the memory controller 300. The memory controller 300 can include a front end portion 304, a central controller 310, a back end portion 319, and the management unit 334.

As shown in FIG. 3, the front end portion 304 can include an interface 306 that includes multiple I/O lanes 302-1, 302-2, . . . , 302-N (individually or collectively referred to as I/O lanes 302). In some embodiments the quantity of I/O lanes 302 can be between eight (8) I/O lanes and sixteen (16) I/O lanes. Increasing the amount of I/O lanes 302 can increase the amount of sideband communications. In some embodiments, the I/O lanes 302 are configured to transfer access requests to or from circuitry external to the memory controller at various unrestricted transfer rates. More specifically, each of the I/O lanes can be configured to transfer the requests at a rate of at least 32 GT/s. Therefore, increasing the number of I/O lanes 302 can increase the amount of data written per second. Further, in some embodiments, the I/O lanes can be configured to transfer access requests to or from circuitry external to the memory controller according to a compute express link protocol.

The interface 306 can be a peripheral component interconnect express (PCIe) 5.0 interface coupled to the I/O lanes 302. In some embodiments, the memory controller 300 can receive access requests via the PCIe 5.0 interface 306 according to a CXL protocol. The interface 306 can receive data from a host 303 through I/O lanes 302. Front end portion 304 can also include front end logic 308. The front end logic 308 can include circuitry for managing sideband communication exchanges involving the front end portion 304 through the address queues 323. In some embodiments, the address queues 323 can also be coupled to an I/O bus 321 to communicate with management unit 334.

As shown in FIG. 3, the central controller 310 can include auxiliary interface 335 to post and receive the data. The data is exchanged with the host through the auxiliary interface 335. The auxiliary interface 335 can also be coupled to an I/O bus 321 to communicate with management unit 334. In some embodiments, the central controller 310 can receive instructions from management unit 334 on encrypting sideband communications using the auxiliary security component within the central controller 310.

As shown in FIG. 3, the back end portion 319 is configured to couple the memory controller to a memory device 328A, 328M. In some embodiments, the memory devices can include DRAM memory device 328A and/or FeRAM memory device 328M. In some embodiments, the auxiliary interface 309 can also be coupled to an I/O bus 321 to communicate with management unit 334. The back end portion 319 can receive sideband communications from the management unit 334, gotten from the host 303 to be transmitted to a memory device 328A, 328M.

As shown in FIG. 3, the memory controller 300 can include a management unit 334 configured to monitor a plurality of characteristics of the memory controller 300. The management unit 334 can include an I/O bus 321 to manage out-of-band data, a microcontroller 340 to execute instructions associated with to applying an additional layer of encryption or decryption for each of the plurality of channels and to monitor characteristics of the memory controller 300, a management unit memory 342 to store data associated with monitoring the characteristics of the memory controller 300 and. The characteristics of the memory controller 300 that the management unit 334 can monitor can include, but are not limited to, the amount of voltage being applied to the memory controller 300 and the temperature of the memory controller 300.

Figure 4:
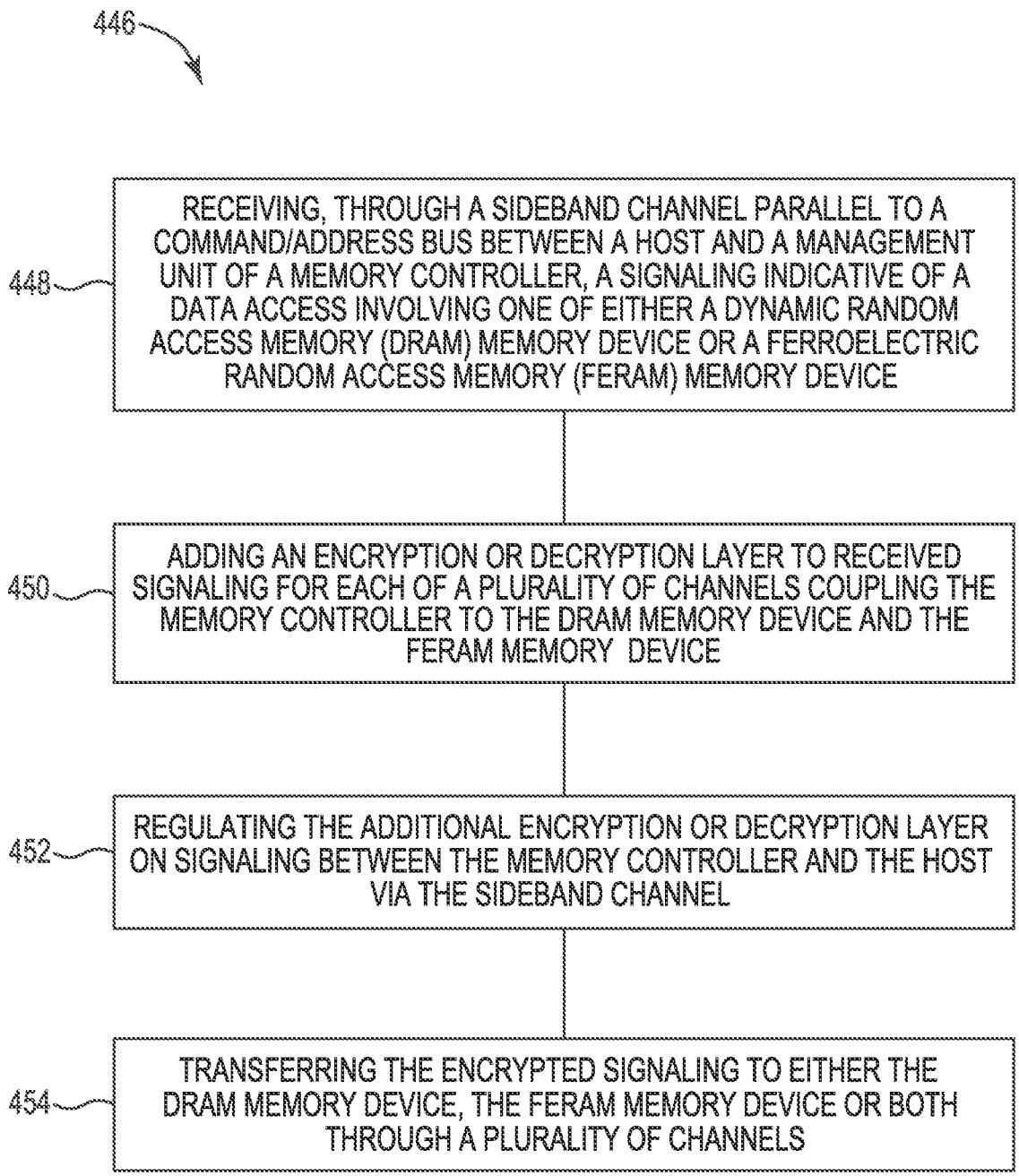
FIG. 4 illustrates a flow diagram of an example method for managing sideband communication in accordance with a number of embodiments of the present disclosure.

FIG. 4 illustrates a flow diagram of an example method 446 for managing sideband communication in accordance with a number of embodiments of the present disclosure. The method 446 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 448, the method 446 can include receiving, through a sideband channel connecting a host to a management unit of a memory controller, a signaling indicative of a data access involving one of either a dynamic random access memory (DRAM) memory device or a ferroelectric random access memory (FeRAM) memory device. The front end portion can receive a request to send signaling. The signaling can be sent through the sideband channel which connects the host to a management unit of a memory controller. The sideband channel can be used to power cycle a server and monitor fan speeds, component temperatures, and hardware failures. The signaling can be a sideband communication indicative of a data, commands, and/or instructions exchanged between the memory controller and the host. The signaling can meant for a memory device within the memory controller. The memory device can be either a DRAM memory device or a FeRAM memory device or both.

At block 450, the method 446 can include adding an encryption or decryption layer to received signaling for each of a plurality of channels coupled to the memory controller. In some embodiments, the signaling, can be sent to the auxiliary security component for an encryption or decryption layer. The encryption or decryption layer can be added onto received signaling for each of the plurality of channels within the auxiliary security component of the central controller portion. The plurality of channels can couple the memory controller to the DRAM memory device and the FeRAM memory device.

The additional layer of encryption can be applied using an authentication method to mask the signaling. Additional layers of encryption can be added to each signaling with the host in addition to the encryption layer for each of the plurality of channels. Decryption can be enacted using vendor specific commands. The commands may support a temporary or a permanent method.

At block 452, the method 446 can include regulating the additional encryption or decryption layer on exchanges between the memory controller and the host via the sideband channel. The management unit manages the encryption or decryption layers to be placed on each channel for signaling between the memory controller and the host, which occurs via the sideband channel. Regulating the additional encryption or decryption layers can performed by a firmware within the management unit. In one embodiment, the request to power-off can trigger a complete erasure of the memory controller's memory. Once the erasure is complete, a signal can be sent to the host.

At block 454, the method 446 can include transferring the encrypted signaling to either the DRAM memory device, the FeRAM memory device or both through a plurality of channels. In some embodiments, the encrypted signaling can be transferred to the FeRAM memory device and the DRAM memory device through the back end portion of the memory controller. The FeRAM memory device and the DRAM memory device are connected to the memory controller through the plurality of channels.

Figure 5:
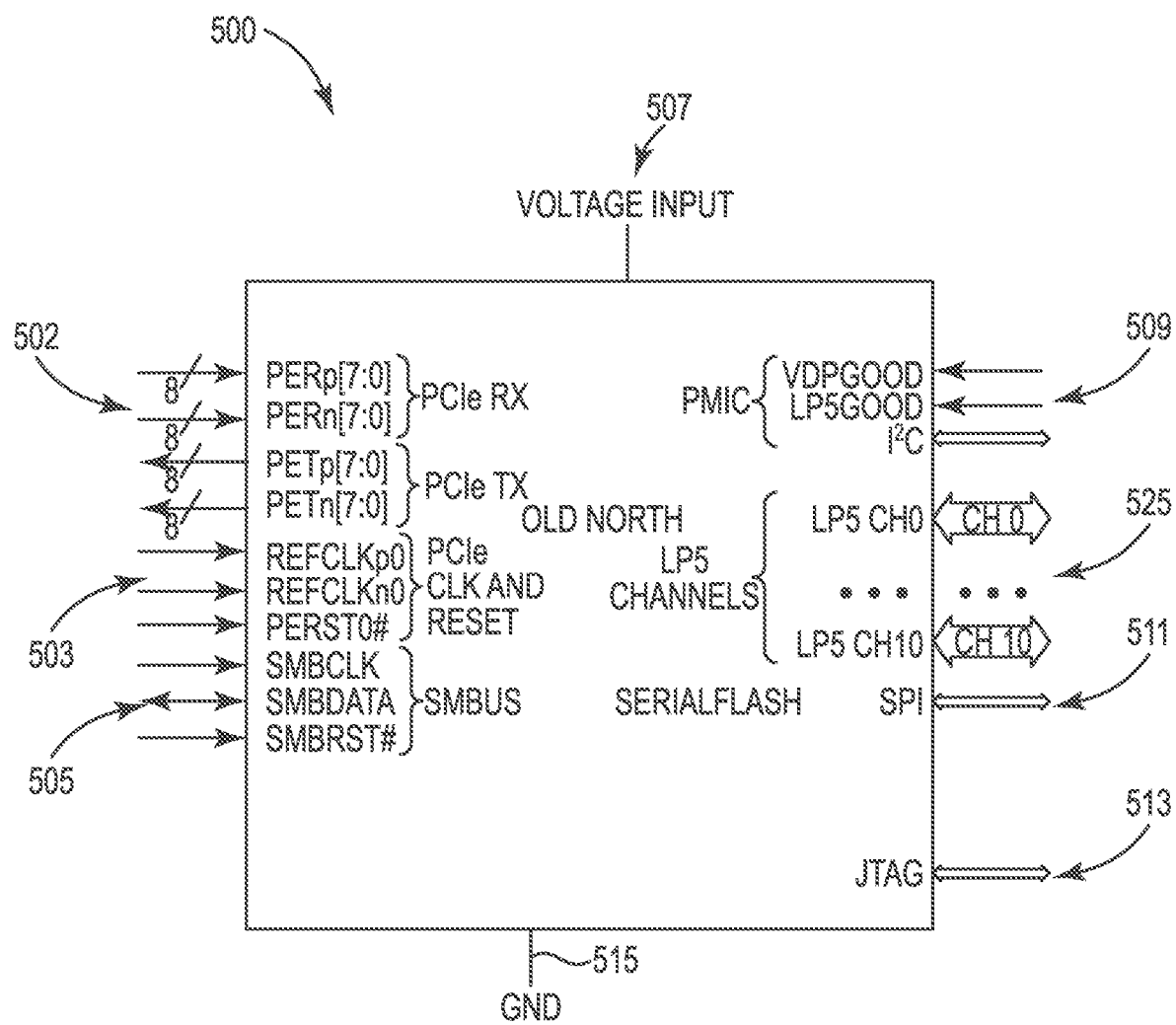
FIG. 5 illustrates a block diagram illustrating a flow of data through a controller for managing sideband communication in accordance with a number of embodiments of the present disclosure.

FIG. 5 illustrates a memory controller 500 for managing sideband communication in accordance with a number of embodiments of the present disclosure. The memory controller 500 can include PCIe I/O lanes 502-1, 502-2, 502-3, ..., 502-N (individually or collectively referred to as PCIe I/O lanes 502), PCIe clock and reset I/O lanes 503-1, 503-2, ..., 503-N (individually or collectively referred to as PCIe clock and reset I/O lanes 503), and SMBus I/O lanes 505-1, 505-2, 505-3 (individually or collectively referred to as SMBus I/O lanes 505). A sideband channel may use SMBus I/O lanes 505 to connect to the host to exchange sideband communications. Further, the memory controller 500 can include a voltage receiving bus 507, a plurality of power management integrated circuit (PMIC) I/O lanes 509-1, 509-2, 509-3 (individually or collectively referred to as PMIC I/O lanes 509), channels 525-1, ..., 525-N (individually or collectively referred to as channels 525), a serial peripheral interface (SPI) 511, a JTAG bus 513, and a ground connection bus 515.

As shown in FIG. 5, the I/O lanes 502 can include PCIe RX (receiving) lanes and PCIe TX (transmitting) lanes. As stated above, the I/O lanes can write (e.g., transmit) data to a host and receive data from a host. The PCIe clock and reset lanes 503 can include at least one PCIe clock lane to determine the timing of data input and output to and from a memory system and at least one PCIe reset lane that can receive a signal to reset the memory system. Further, the SMBus I/O lanes 505 can include at least one SMBus clock lane to determine the timing of data input and output to and from the memory system, at least one SMBus data lane to write and receive data, and at least one SMB reset lane to receive a signal to reset the memory system.

As shown in FIG. 5 the PMIC I/O lanes 509 can include a lane to receive a VDDP voltage to stabilize a clock of the memory system at high frequencies and a lane to receive data from a low power double data rate $5^{th}$ generation (LPDDR5) memory component, and a lane to utilize an $I^2C$ protocol to connect low-speed memory components. Further, as shown in FIG. 5, the memory controller 500 can include channels 525 to couple the memory controller to at least one DRAM memory device and/or at least one FeRAM memory device, an SPI lane 511 used for short-distance communication, and a JTAG lane 513 to couple the memory controller 500 to an external memory component. Further, as shown in FIG. 5, the memory controller 500 can include a voltage input bus 507 to receive a voltage supply and a ground connection bus 515 to ground the memory controller 500.

Figure 6:
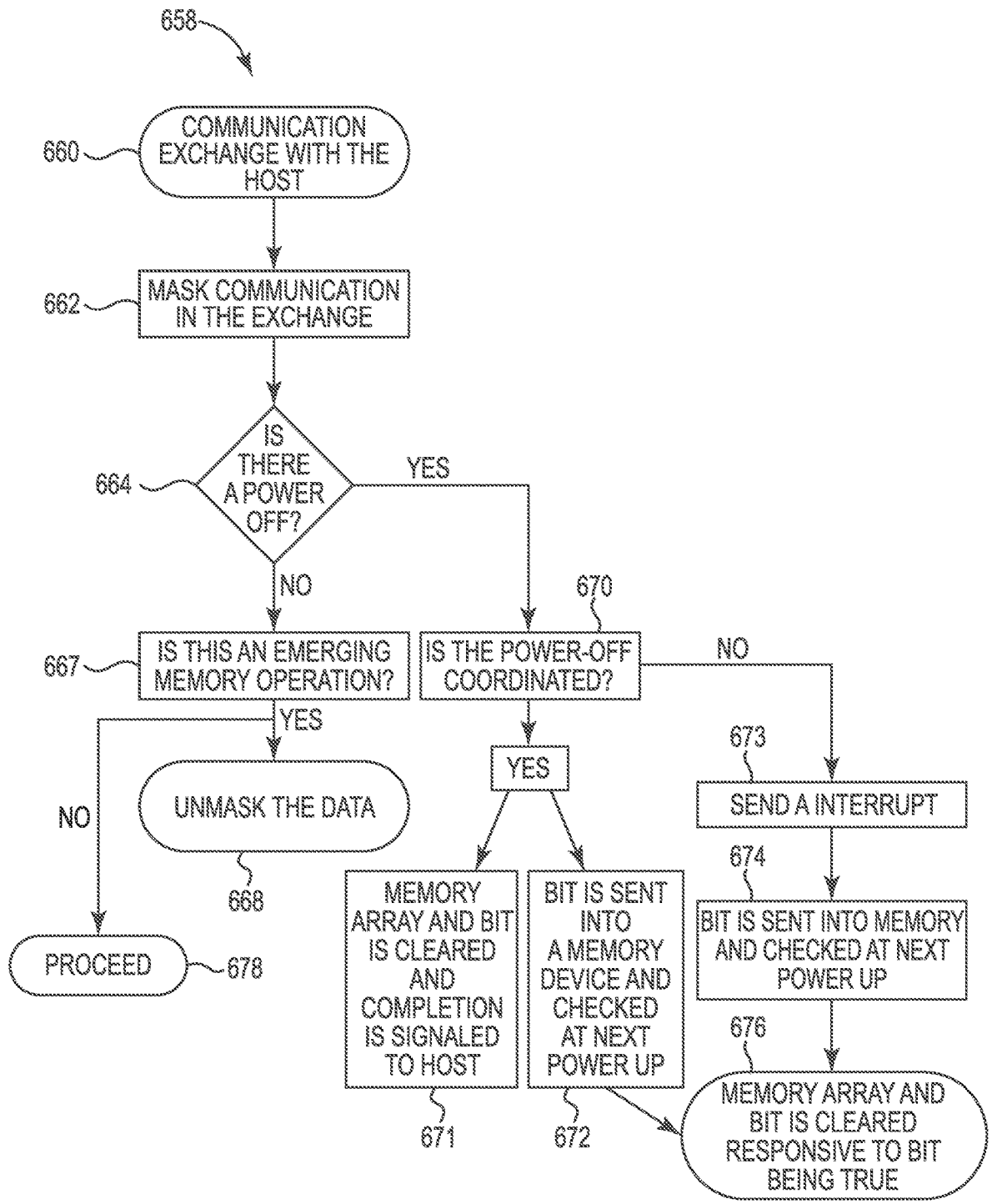
FIG. 6 illustrates a controller for managing sideband communication in accordance with a number of embodiments of the present disclosure.

FIG. 6 is a flow chart of an example flow diagram 658 for managing sideband communication in accordance with a number of embodiments of the present disclosure. At block 660, the flow 658 can include a communication exchange with the host. In some embodiments, the communication can include data, commands, and/or instructions transferred between the memory controller and the host. The communication involves a memory device, such as a DRAM memory device or a FeRAM memory device.

At block 662, the flow 658 can include masking the communication during the exchange between the memory controller and the host. The memory controller can encrypt communication being sent to the host. The encryption can occur in the auxiliary security component of the management unit. The encryption can be managed by firmware within the management unit of the memory component. The parameters of encrypting or decrypting an exchange can be controlled by the firmware.

At block 664, the flow 658 can include deciding whether there is a power off. In some embodiments, the timing and power supply configurations of the computing system is a protected data to be protected by the firmware.

At block 667, the flow 658 can include deciding if there is an emerging memory operation responsive to a determination that there is no power-off. An emerging memory operation is an exception to the encryption of sideband communications between the host and the controller.

At block 670, the flow 658 can include deciding if the power-off is coordinated responsive to a determination that there is a power-off. A power-off can be coordinated or uncoordinated. Erasure of the memory array of the memory controller can be implemented whether the power down is coordinated or uncoordinated.

At block 668, the flow 658 can include unmasking the data responsive to determining that the communication exchange is an emerging memory operation. To promote transparency, reliability, and persistency, sideband communications can be decrypted, allowing the host to view sideband communications.

At block 678, the flow 658 can include proceeding responsive to a determination that there is no power off and no emerging memory operation. The communication can proceed encrypted with the information masked towards the host.

At block 671, the flow 658 includes clearing the memory array and the bit signaling completion to the host responsive to the power-off being coordinated. In one embodiment, the request to power-off can trigger a complete erasure of the memory controller's memory array. Once the erasure is complete, a signal can be sent to the host and the bit is cleared.

At block 672, the flow 658 includes sending a bit into a memory device and checking the bit at the next power up responsive to the power-off being coordinated. In one embodiment, a host-controlled request to power-off can erase any runtime encryption keys used. A bit can then be sent into a non-volatile memory device.

At block 673, the flow 658 includes sending an interrupt responsive to the power-off being uncoordinated. During an uncoordinated power down, an internal interrupt can be sent to the management unit controller. The decryption can be enacted using vendor specific commands. The commands can support a temporary or a permanent method.

At block 674, the flow 658 includes sending a bit into the memory device and checking the bit at the next power up. As such, the bit survives the power cycle to be checked during the power up. A bit can then be sent into the FeRAM memory device 128. At the next power up, the bit can be checked.

At block 676, the flow 658 includes clearing the entire memory array responsive to the bit being true. At the next power up, the bit can be checked and if true, the entire memory array can be cleared. Once the erasure is complete and the power up is complete, a signal can be sent to the host indicating the end of the clear process; and the bit can be cleared. After a bit is checked at the next power up as described in flow 658, a similar step can follow The figures herein follow a numbering convention in which the first digit or digits correspond to the figure number and the remaining digits identify an element or component in the figure. Similar elements or components between different figures may be identified by the use of similar digits. For example, 104 may reference element "04" in FIGS. 1A-1B, and a similar element may be referenced as 204 in FIG. 2. A group or plurality of similar elements or components may generally be referred to herein with a single element number. For example, a plurality of reference elements 216-1 to 216-N may be referred to generally as 110. As will be appreciated, elements shown in the various embodiments herein can be added, exchanged, and/or eliminated so as to provide a number of additional embodiments of the present disclosure. In addition, the proportion and/or the relative scale of the elements provided in the figures are intended to illustrate certain embodiments of the present disclosure and should not be taken in a limiting sense.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and processes are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus, comprising:
a memory controller configured to manage a first type of memory device that operates according to a first set of timing characteristics and a second type of memory device that operates according to a second set of timing characteristics, wherein the memory controller comprises:
a front end portion comprising:
an interface to manage sideband communication and including a plurality of input/output (I/O) lanes;
a central controller portion configured to cause performance of a memory operation and comprising:
a cache memory to store data associated with performance of the memory operation;
an auxiliary security component configured to encrypt the data before storing the data in the first type of memory device or the second type of memory device; and
an auxiliary interface to post and receive the data;
a back end portion to couple the memory controller to a plurality of memory ranks via a plurality of channels, the back end portion further comprising an auxiliary interface to post and receive the data; and
a management unit configured to, wherein the management unit comprises:
an I/O bus configured to manage out-of-band data including received host commands;
a management unit controller configured to execute instructions to apply a particular operation code, using the auxiliary security component, as an additional layer of encryption or decryption associated with received host commands for each of the plurality of channels and to execute instructions associated with monitoring the characteristics of the memory controller; and
management unit memory to store data associated with monitoring the characteristics of the memory controller.

2. The apparatus of claim 1, wherein the additional layer of encryption/decryption associated with the received host commands comprises a subset of configuration parameters of the front end, the central controller, and the back end configurable blocks are provided and controlled through firmware to mask data towards a host for data exchanged between the host and the apparatus during initialization, management, and diagnostics of the apparatus.

3. The apparatus of claim 2, wherein, in a privileged working mode, performance metrics or characterization metrics, or both, are masked by the firmware.

4. The apparatus of claim 2, wherein the firmware masks data and messages towards the host associated with;
RAID unrecovered error signal events;
metrics for device characterization;
protected configuration data;
selective imprint removal and asymmetric cycling removal;
memory media management
protected status data; and
protected memory commands.

5. The apparatus of claim 4, wherein the protected configuration data comprises:
timing and power supply configurations;
connected memory type identification;
cache configurations; and
error correction configurations.

6. The apparatus of claim 2, wherein the management unit controller receives the sideband communication related to power state changing via the I/O bus to perform a background full data erase of persistent memory before power-off of the apparatus.

7. The apparatus of claim 6, wherein the erase is implemented whether the power-off is coordinated or uncoordinated.

8. The apparatus of claim 7, wherein the data erase during the coordinated power-off includes a bit in non-volatile memory being checked at a next power up and performing the background full data erase responsive to the bit being true.

9. The apparatus of claim 7, wherein the data erase during the uncoordinated power-off includes a non-maskable interrupt with a bit to the management unit controller and at a next power up, performing the background full data erase responsive to the bit being true.

10. A system, comprising:
a host;
a memory controller coupled to the host using a communication channel and configured to manage a first type of memory device that operates according to a first set of timing characteristics and a second type of memory device that operates according to a second set of timing characteristics, wherein the memory controller comprises:
a front end portion comprising:
an interface to manage sideband communication and including a plurality of input/output (I/O) lanes;
a central controller portion configured to cause performance of a memory operation and comprising:
a cache memory to store data associated with performance of the memory operation;
an auxiliary security component configured to encrypt the data before storing the data in the first type of memory device or the second type of memory device; and
an auxiliary interface to post and receive the data;
a back end portion to couple the memory controller to a plurality of memory ranks via a plurality of channels, the back end portion further comprising an auxiliary interface to post and receive the data; and
a management unit configured to, wherein the management unit comprises:
an I/O bus configured to manage out-of-band data including received host commands;
a management unit controller configured to execute instructions to apply a particular operation code, using the auxiliary security component, as an additional layer of encryption or decryption associated with received host commands for each of the plurality of channels and to execute instructions associated with monitoring the characteristics of the memory controller; and
management unit memory to store data associated with monitoring the characteristics of the memory controller.

11. The system of claim 10, wherein the host is able to view emerging memory technology to improve reliability and persistency and force a full erase on a power off.

12. The system of claim 10, wherein the communication channel uses CXL Mailboxes to exchange messages with the host.

13. The system of claim 10, wherein the plurality of I/O lanes are configured to transfer access requests to or from circuitry external to the memory controller at unrestricted transfer rates.

14. The system of claim 10, wherein the received host commands are protected from reverse engineering.

15. The system of claim 10, wherein the communication channel uses a System Management Bus (SMBus) to exchange messages with the host.

* * * * *